United States Patent [19]

Tateishi

[11] Patent Number: 5,170,386
[45] Date of Patent: Dec. 8, 1992

[54] SPINDLE SEVO CIRCUIT FOR DRIVING A DATA STORAGE DISK HAVING CLV TYPE RECORDING FORMAT

[75] Inventor: Kiyoshi Tateishi, Tokorozawa, Japan

[73] Assignee: 501 Pioneer Electronic Corporation, Tokyo, Japan

[21] Appl. No.: 601,319

[22] Filed: Oct. 23, 1990

[30] Foreign Application Priority Data

Dec. 28, 1989 [JP] Japan .................................. 1-344057

[51] Int. Cl.⁵ .......................... G11B 7/00; G11B 15/18
[52] U.S. Cl. ........................................ 369/50; 369/54; 369/59; 360/73.01
[58] Field of Search ........................ 369/50, 54, 59, 58, 369/32, 44.27, 124, 47; 360/73.01

[56] References Cited

U.S. PATENT DOCUMENTS

| | | | |
|---|---|---|---|
| 4,603,412 | 7/1986 | Tamayaki | 369/50 |
| 4,623,939 | 11/1986 | Machida et al. | 369/50 X |
| 4,908,810 | 3/1990 | Oie | 369/50 |
| 5,040,076 | 8/1991 | Tenma | 369/50 X |
| 5,065,385 | 11/1991 | Konno | 369/50 |
| 5,086,421 | 2/1992 | Tateishi | 369/50 |

Primary Examiner—Roy N. Envall, Jr.
Assistant Examiner—Nabil Hindi
Attorney, Agent, or Firm—Wegner, Cantor, Mueller & Player

[57] ABSTRACT

A spindle servo circuit for controlling the speed of rotating a disk. The loop gain of the servo loop is changed in response to the change in the linear velocity when the linear velocity is changed by changing the frequency of a master clock. With this feature, stability of the servo characteristic is always assured so that the speed of data recording is increased by the increase in the linear velocity.

3 Claims, 5 Drawing Sheets

Fig. 4A (WHEN THE ROTATION IS ACCELERATED)

Fig. 4B (WHEN THE ROTATION IS DECELERATED)

Fig. 4C (WHEN THE DISK IS ROTATING AT A NORMAL SPEED)

SPINDLE SEVO CIRCUIT FOR DRIVING A DATA STORAGE DISK HAVING CLV TYPE RECORDING FORMAT

BACKGROUND OF THE INVENTION

1. Field of the Invention

The present invention relates to a spindle servo circuit, and more particularly to a spindle servo circuit for use in a disk player for driving a CLV type data storage disk.

2. Description of Background Information

As a method of recording information to a disk-shaped recording medium, a CAV (constant angular velocity) method and a CLV (constant linear velocity) method are known. The disk formatted according to the CLV recording method (hereinafter, simply referred to as CLV disk) has an advantage such that it is possible to record information of an amount which is about twice as large as that in the case of the disk formatted according to the CAV recording method. Therefore, the CLV recording method is used in a digital audio disk called CD (compact disk) and CD-ROM whose basic recording format is the same as of the CD, and is used extensively as a recording medium of digital data.

In recent years, to promptly read out desired data from the CD-ROM, the development of the high-speed access of the CD-ROM is in progress. However, even if the accessing speed is made higher, it takes a relatively long time to read the data in handling data of a large amount such as data of image information or the like. Therefore, a limitation is imposed in reducing the total time which is required to read out the data.

OBJECT AND SUMMARY OF THE INVENTION

It is, therefore, an object of the invention to provide a spindle servo circuit by which the speed of reading recorded information from the disc can be raised to accelerate the data reading procedure.

According to the present invention there is provided a spindle servo circuit for controlling the speed of a spindle motor for rotating the disk in accordance with a spindle error signal, the circuit comprising designating means for designating a predetermined linear velocity, reference clock generating means for generating a reference clock of a predetermined frequency corresponding to the linear velocity designated by the designating means, reproduction clock generating means for generating a reproduction clock synchronized in phase with a read signal from the disc and having a frequency corresponding to the linear velocity designated by the designating means, speed error signal generating means for generating a speed error signal corresponding to a frequency difference between the reference clock and the reproduction clock, phase error generating means for generating a phase error signal corresponding to a phase difference between the reference clock and the reproduction clock, mixing means for mixing the speed error signal and the phase error signal to derive the spindle error signal, and loop characteristic control means for maintaining a loop gain of the servo loop and a mixing ratio in the mixing means at constant values irrespectively of changes in the designated linear velocity.

In the spindle servo circuit according to the invention, the linear velocity can be designated arbitrarily, and a reference clock having a frequency corresponding to the designated linear velocity and a reproduction clock synchronized in phase with a read signal from the disc and having a frequency corresponding to the designated linear velocity are generated, and a speed error signal and a phase error signal respectively corresponding to a frequency difference and a phase difference between the reference clock and a reproduction clock are generated. The error signals are mixed together at a mixing ratio maintained constant irrespectively of changes in the designated linear velocity, to derive a spindle error signal, and a loop gain is also maintained constant irrespectively of the change in the designated linear velocity.

DETAILED DESCRIPTION OF THE PREFERRED EMBODIMENTS

An embodiment of the present invention will be described in detail hereinafter with reference to the drawings.

Figure 1:
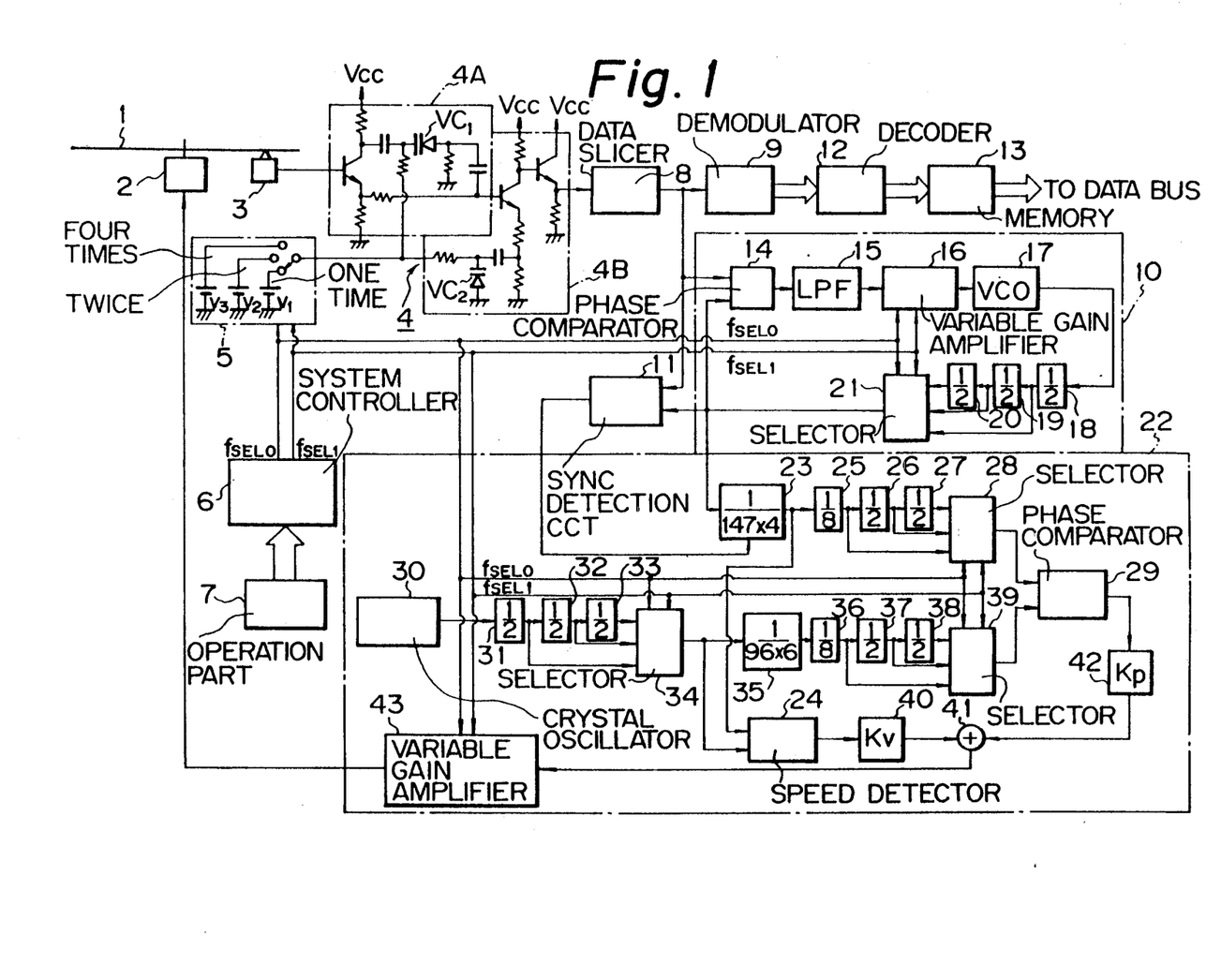
FIG. 1 is a block diagram partly in the form of circuit diagram, showing an embodiment of a disk playing apparatus including a spindle servo circuit according to the present invention.

In FIG. 1, digital data is recorded on a disk 1 by using, for instance, an EFM (Eight to Fourteen Modulation) process. The disk 1 is rotated by a spindle motor 2 and the information recorded on the disk is read by an optical pickup 3. The pickup 3 is supported by a slider (not shown) which is provided to be movable in the radial direction of the disk. A read RF signal which is output from the pickup 3 is supplied to an RF compensating circuit 4. The RF compensating circuit 4 comprises a phase shifting circuit 4A for correcting the phase shift of the read RF signal which is caused due to a so called pattern peak shift phenomenon and, thereby compensating the phase characteristics of the RF signal, and a high frequency emphasizing circuit 4B for correcting the attenuation amount of the high frequency component in the read RF signal due to an aperture effect of a information reading light spot of the pickup 3 and, thereby for compensating the frequency characteristics of the RF signal. The compensating characteristics of both circuits 4A and 4B are made variable. Specifically, the phase shifting circuit 4A and the high frequency emphasizing circuit 4B respectively have varactor diodes VC1 and VC2, and are constructed so that the compensating characteristics thereof change in accordance with values of control voltages $v_1$ to $v_3$ ($v_1 < v_2 < v_3$) which are applied as bias voltages to the varactor diodes $VC_1$ and $VC_2$. One of the control voltages $v_1$ to $v_3$ for changing the compensating characteristics is selectively issued from a control voltage generating circuit 5 in accordance with the contents of a control code which is issued from a system controller 6.

The system controller 6 is constituted, for instance, by a microcomputer. When any one of three levels of the linear velocities such as the reference linear velocity (one time), a linear velocity twice as fast as the reference linear velocity, and a linear velocity four times as fast as the reference linear velocity is designated in an operation unit 7 as a linear velocity for reading information, the system controller 6 issues control codes $fSEL_0$ and $fSEL_1$ corresponding to the designated linear velocity. The contents of the control codes $fSEL_0$ and $fSEL_1$ are defined, for example, as shown in the following table.

TABLE

| linear velocity | 4 times | twice | 1 time |
|---|---|---|---|
| $fSEL_0$ | 0 | 1 | 0 |
| $fSEL_1$ | 0 | 0 | 1 |

The RF signal whose phase and frequency characteristics are compensated by the RF compensating circuit 4 is waveform shaped and converted into the square wave pulse by a data slicing circuit 8. Subsequently, the square wave pulse is supplied to a demodulating circuit 9, a PLL circuit 10 for producing clocks according to the invention, and a sync detection circuit 11. The demodulating circuit 9 executes a demodulating process of the EFM signal in the form of the square wave pulse and an error detection and error correction operation, thereby demodulating the data. The demodulated data is decoded by a decoder 12 and converted into image data and various control data. These data are once written into a buffer memory 13, and in turn transferred to a data bus (not shown) at a high speed.

The clock producing PLL circuit 10 extracts the clock component in the EFM signal series and produces pulses of a predetermined frequency synchronized with the extracted clock component and issues them as reproduction clocks. Specifically, there is provided a phase comparator 14 for comparing phases of the EFM signal of the square wave pulse and the reproduction clocks. The low frequency component in a comparison output signal, that is, a phase difference signal, passes through an LPF (low pass filter) 15. The low frequency component is amplified by a variable gain amplifier 16 and is used as a control voltage of a VCO 17. The variable gain amplifier 16 is configured so that its gain changes among values of +12 dB, +6 dB, and 0 dB for the linear velocities of one time, twice, and four times the normal velocity respectively, in accordance with the contents of the control codes $fSEL_0$ and $fSEL_1$ which are supplied from the system controller 6. A clock of 34.5744 MHz is issued from the VCO 17, and then frequency divided into ½ of the original frequency by means of three ½ frequency dividers 18 to 20, which are connected in series, and is supplied to one input terminal of a 3-input selector 21. On the other hand, the clock from the VCO 17 is frequency divided into ¼ of the original frequency by means of the ½ frequency dividers 18 and 19 and is supplied to another input terminal of the selector 21. The clock from the VCO 17 is further frequency divided into ½ of the original frequency by means of the ½ frequency divider 18 and is supplied to the other remaining input terminal of the selector 21. The selector 21 selectively outputs one of the clocks, as the reproduction clock, which are frequency divided to ⅛, ¼, and ½ of original frequency for the linear velocities of one time, two times, and four times the normal velocity respectively on the basis of the contents of the control codes $fSEL_0$ and $fSEL_1$ supplied from the system controller 6. The reproduction clock is supplied to the sync detection circuit 11 and a CLV servo circuit 22.

The sync detection circuit 11 extracts the sync signal inserted during the recording by the reproduction clocks from the EFM signal of the square wave pulse and issues the extracted sync signal as a reproduction sync signal.

In the CLV servo circuit 22, the reproduction clocks from the PLL circuit 10 are frequency divided into $1/(147 \times 4)$ by a frequency divider 23 which is reset by the reproduction sync signal from the sync detection circuit 11. The frequency divided clock becomes pulses of a duty ratio of 50% which are synchronized with the reproduction sync signal and is used as a writing clock of the memory 13 mentioned above. On the other hand, the writing clock is supplied to one input terminal of a speed detector 24. The writing clock is frequency divided into ½ of the original frequency by a ½ frequency divider 25 and is supplied to one input terminal of a 3-input selector 28. The frequency divided clock is further transmitted through a ½ frequency divider 26 and frequency divided into 1/16 of the original frequency and supplied to another input terminal of the selector 28. Then, the frequency divided clock is further transmitted through a ½ frequency divider 27 and frequency divided into 1/32 of the original frequency and supplied to the other remaining input terminal of the selector 28. On the basis of the contents of the control codes $fSEL_0$ and $fSEL_1$ which are supplied from the system controller 6, the selector 28 outputs the clocks which were frequency divided into ⅛, 1/16, and 1/32 of the original frequency for the linear velocities of one time, twice, and four times the normal velocity, respectively. The frequency divided clocks are selectively supplied to one input terminal of a phase comparator 29.

On the other hand, a clock of 33.6688 MHz is issued from a crystal oscillator 30 as a reference sync signal. The reference clock is frequency divided into ½ of the original frequency by means of three ½ frequency dividers 31 to 33, which are connected in series, and is supplied to one input terminal of a 3-input selector 34. The clock is then frequency divided into ¼ of the original frequency by means of the ½ frequency dividers 31 and 32 and supplied to another input terminal of the selector 34. The clock is further frequency divided into ½ of the original frequency by means of the ½ frequency divider 31 and supplied to the other remaining input terminal of the selector 34.

On the basis of the contents of the control codes $fSEL_0$ and $fSEL_1$ which are supplied from the system controller 6, the selector 34 issues one of the clocks, as a master clock, which is obtained as ⅛, ¼, or ½ of the original frequency respectively for the linear velocities of one time, twice, and four times the normal velocity. The master clock is supplied to the other input terminal of the speed detector 24 and is frequency divided into 1/(96×6) of the original frequency by a frequency divider 35 and used as a reading clock of the memory 13 mentioned before.

The reading clock is frequency divided into ⅛ of the original frequency by a ⅛ frequency divider 36 and supplied to one input terminal of a 3-input selector 39. The reading clock is further transmitted through a ½ frequency divider 37 and frequency divided into 1/16 of the original frequency and supplied to another input terminal of the selector 39. The reading clock is further transmitted through a ½ frequency divider 38 and frequency divided into 1/32 of the original frequency and supplied to the other remaining input terminal of the selector 39. On the basis of the contents of the control codes fSEL$_0$ and fSEL$_1$ which are supplied from the system controller 6, the selector 39 issues respectively the clocks ⅛, 1/16, and 1/32 of the original frequency for the linear velocities of one time, two times, and four times the normal velocity, respectively. This clock is supplied to the other input terminal of the phase comparator 29.

The speed detector 24 outputs a speed error signal of a pulse width corresponding to the frequency difference between the master clock and the writing clock. The structure of the speed detector 24 will be explained later.

The speed error signal is multiplied with a coefficient $K_v$ by a coefficient multiplier 40 and supplied to one input terminal of an adder 41. On the other hand, the phase comparator 29 issues a phase error signal having a pulse width corresponding to the phase difference between the clocks from the selectors 28 and 39, that is, the phase difference between the writing clock and the frequency divided clock which is obtained by frequency dividing the master clock at a frequency dividing ratio corresponding to the designated linear velocity. The phase error signal is multiplied with a coefficient $K_p$ by a coefficient multiplier 42 and supplied to the other input terminal of the adder 41. The adder 41 adds the speed error signal multiplied with the coefficient $K_v$ and the phase error signal multiplied with the coefficient $K_p$ together and issues the result as a spindle error signal. The spindle error signal is supplied to the spindle motor 2 through a variable gain amplifier 43. The gain of the variable gain amplifier 43 is switched among 0 dB, +6 dB, and +12 dB for the linear velocities of one time, twice, and four times the normal velocity in accordance with the contents of the control codes fSEL$_0$ and fSEL$_1$ which are supplied from the system controller 6.

The rotational speed of the disk 1 is controlled by the CLV servo circuit 22 with the above construction in such a manner that the linear velocity becomes constant and is set to the linear velocity designated by the operation unit 7.

The structure and operation of the speed detector 24 will be explained with reference to the timing chart of FIG. 3 on the basis of the block diagram of FIG. 2.

Figure 2:
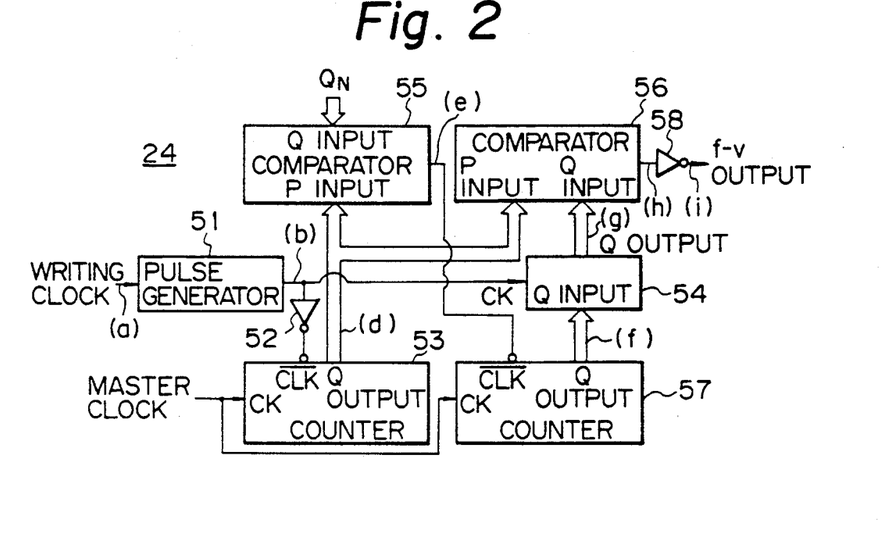
FIG. 2 is a block diagram showing an example of the construction of a velocity detector in the circuit of FIG. 1.
Figures 3A, 3B:
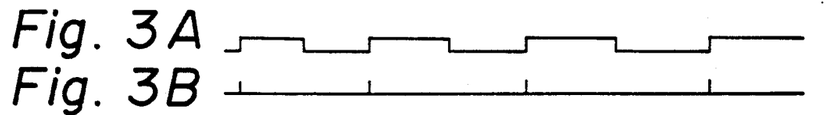
FIGS. 3A-3I is a timing chart for explaining the operation of the circuit shown in FIG. 2.
Figures 3C, 3D, 3E:
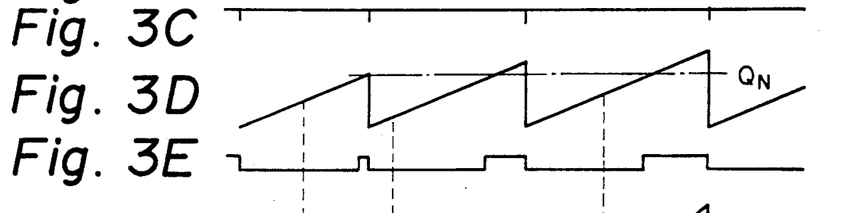
Figures 3F, 3G:
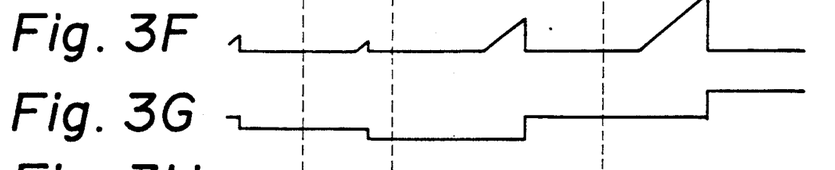
Figures 3H, 3I:
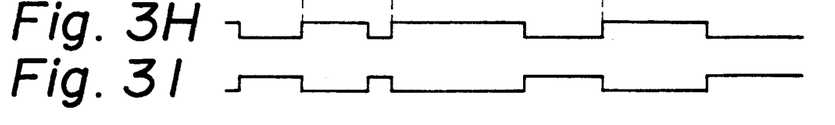

FIGS. 3A through 3I respectively show the waveform of signals (a) through (i) appearing at various points of the circuit shown in FIG. 2.

As shown in FIG. 2, the writing clock (a) obtained as the frequency divided clock of the reproduction clock is supplied to a pulse generator 51. The pulse generator 51 generates pulses (b) at timings of the leading edges of the writing clock (a). The pulses (b) generated in this way are inverted in polarity by an invertor 52, and the resultant pulses (c) of the inverted polarity are supplied to a clear input terminal of a counter 53 and directly supplied to a clock input terminal of a D (data) latch circuit 54. The counter 53 receives the master clock as a clock input, and starts the counting operation after being reset at timings of the leading edges of the writing clock (a). The Q output of the counter 53 representing its count value (d) is supplied to P input terminals of the comparators 55 and 56. The comparator 55 receives a comparison reference value $Q_N$ at its Q input terminal, and generates an output signal (e) of a high level when the count value of the counter 53 at the P input equals or exceeds the comparison reference value $Q_N$. The output signal (e) of the comparator 55 is supplied to a clear input terminal of a counter 57.

The counter 57 receives the master clock at its clock input terminal, and executes the counting operation only when the high level output signal (e) of the comparator 55 is produced. When a low level output signal is issued from the comparator 55, the counter 57 is cleared to have a zero count value. The Q output signal of the counter 57 representing its count value is supplied to a D (data) input terminal of the D latch circuit 54. The latch circuit 54 latches the count value of the counter 57 at timings of the leading edges of the writing clock (a). The latched value (g) is supplied to a Q input terminal of the comparator 56. The comparator 56 produces a high level output signal (h) when the count value (d) of the counter 53 received at its P input terminal equals or exceeds the latched value (g). The output signal (h) of the comparator 56 is then inverted in polarity by an invertor 58 to provide an f-v output signal (i) serving as the speed error signal.

Figure 4A:
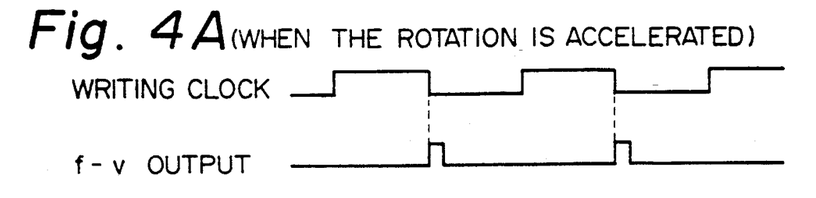
FIGS. 4A, 4B, and 4C are timing charts showing the relation between a writing clock and a velocity detection output in conditions where the rotational speed of the spindle motor is high, low, and is at a rated speed, respectively.
Figure 4B:
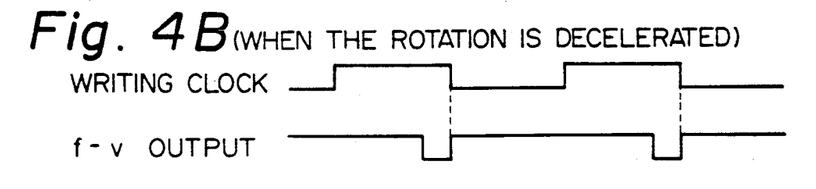
Figure 4C:
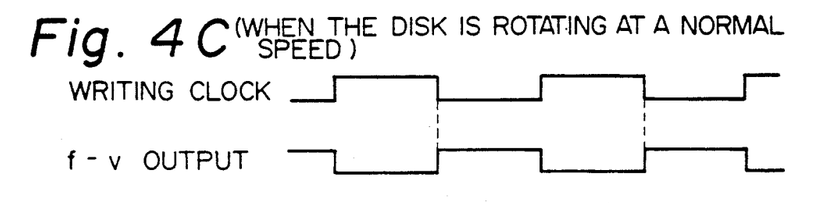

In the speed detector 24 constructed as explained above, the high level period of the f-v output signal decreases when the rotational speed of the spindle motor 2 is increased to shorten the period (to raise the frequency) of the writing clock as shown in FIG. 4A. Conversely, the high level period of the f-v output signal increases when the rotational speed of the spindle motor 2 is decreased to lengthen the period (to lower the frequency) of the writing clock as shown in FIG. 4B. When the spindle motor 2 is rotating at a rated speed and the spindle servo loop is locked as shown in FIG. 4C, the f-v output signal will have a duty ratio of 50%.

Figure 5:
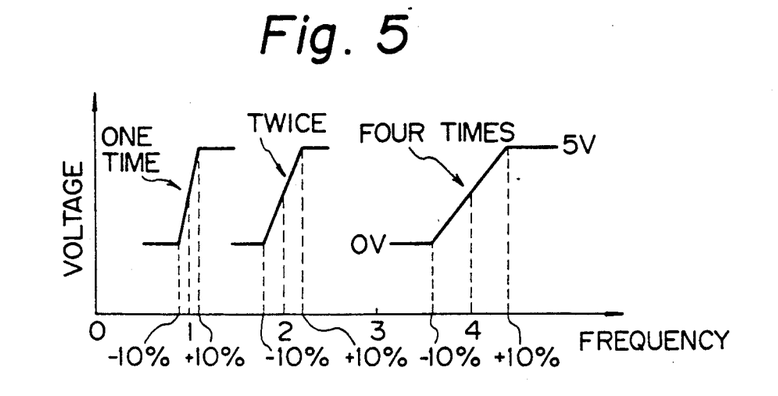
FIG. 5 is a diagram showing the frequency detection characteristic of the velocity detector.
Figure 6:
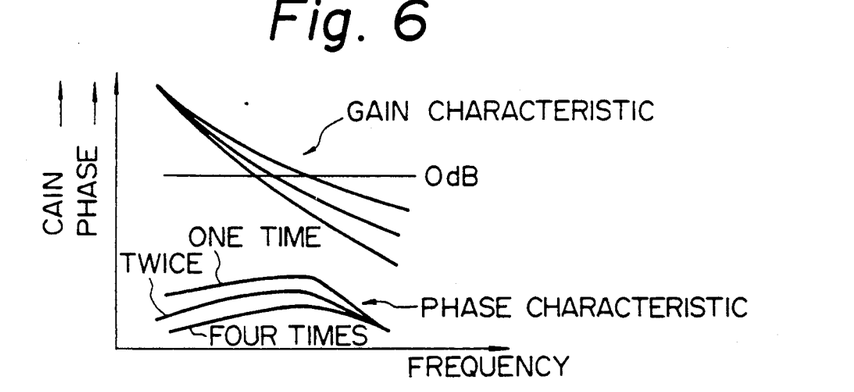
FIG. 6 is a diagram showing a spindle open loop characteristic obtained when the linear velocity is changed, in a state where the frequency of the input clock and loop gain are maintained constant.

As explained above, the speed error signal obtained as the detection output signal of the speed detector 24 expresses the speed error as the change in the pulse width. An integration value of this change in the pulse width is expressed as the axis of ordinates in the frequency detection characteristics of FIG. 5, in which the integration value varies within a range of 0 through 5 volts. By adjusting the speed detector 24 so that the duty ratio of the output pulse signal becomes 50% at the center frequency and the input D (dynamic) range equals ±10% and the D range of the output signal corresponds to the input D range, the integrated value will have a voltage of 0 volt for −10% and a voltage of 5 volts for +10%. In this case, the sensitivity $\beta$ of the detection of speed assumes a relation $\beta$=axis of ordinates/axis of abscissas, and the sensitivity $\beta$ decreases by a factor of ¼ when the designated linear velocity is four times the normal linear velocity as compared with the case where the designated linear velocity is one time the normal linear velocity. This means there is a sensitivity drop of −12 dB. However, although the sensitivity drops when the designated linear velocity is four times the normal linear velocity, the input D range is multiplied four times as compared with the case where the designated linear velocity is one time the normal linear velocity. Therefore, the ratio of the input D range against the center frequency having the range of ±10% is maintained unchanged. If the ratio of the input D range against the center frequency drops, it also cause a reduction in the capacity of the circuit to lead-in to the center frequency. Therefore, the D range must not be narrowed. As a result, it is suitable to select the characteristic shown in FIG. 5 as the frequency detection characteristic of the speed detector 24.

In the CLV servo circuit 22, the frequency of the master clock which is supplied to one of clock input terminals of the speed detector 24 varies with the designated linear velocity. Therefore, the sensitivity of detection of the speed detector 24 varies among values of 0 dB, −6 dB, and −12 dB for the designated linear velocities of one time, twice, and four times the normal linear velocity. This causes a reduction in mixing ratio of the speed error signal against the phase error signal. As a result, both of the gain characteristic and the phase characteristic are changed so that the phase margin is reduced when the designated linear velocity is four times the normal linear velocity.

Assume that the coefficients $K_V$ and $K_p$ are constant, the sensitivity in the phase comparison also must be changed with the designated linear velocity in order to maintain the mixing ratio between the speed error signal and the phase error signal since the sensitivity in the speed detection changes with the designated linear velocity. Therefore, frequency dividers 25 through 27 and a selector 28, frequency dividers 36 through 38 and a selector 39 are provide for changing the sensitivity of the phase comparison in response to the change in the designated linear velocity. With this provision, the writing clock, which is obtained by frequency dividing the reproduction clock, and the reading clock, which is obtained by frequency dividing the master clock, are respectively frequency divided at dividing ratios each corresponding to each of the designated linear velocities, and in turn supplied to the phase comparator 29. With this feature, the mixing ratio between the speed error signal and the phase error signal is maintained constant, so that the phase characteristic is also made uniform as illustrated in FIG. 7.

Figure 7:
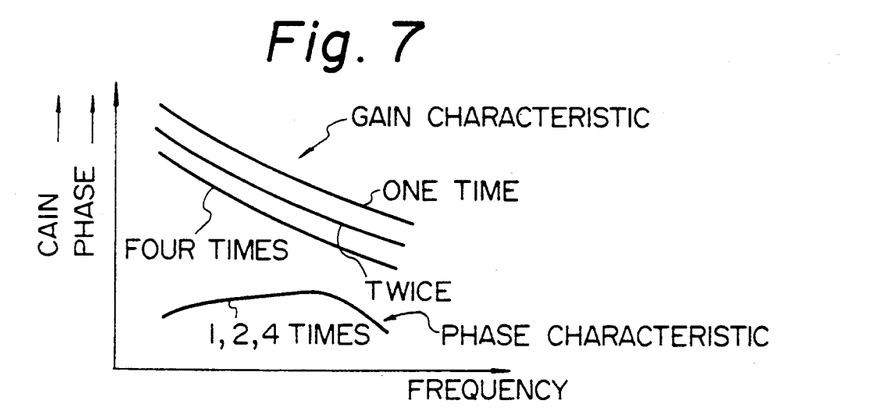
FIG. 7 is a diagram showing a spindle open loop characteristic obtained when the linear velocity is changed, while the loop gain only is maintained constant.
Figure 8:
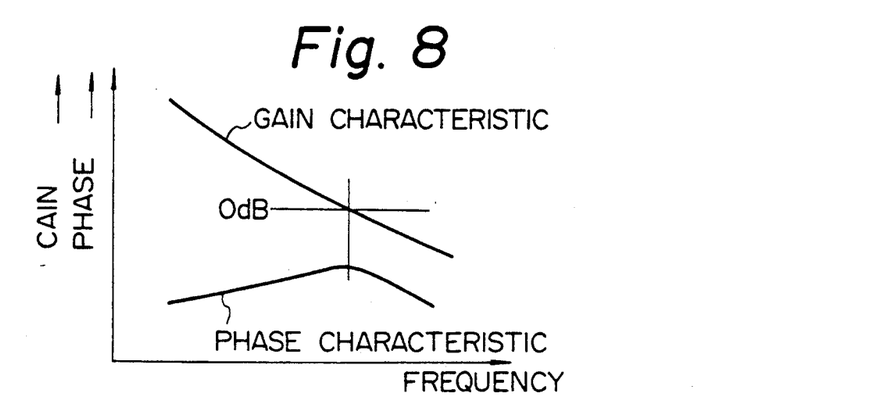
FIG. 8 is a diagram showing a spindle open loop characteristic obtained by the spindle servo circuit according to the present invention when the linear velocity is changed.

As shown in FIG. 7, the loop gain changes by 6 dB for the designated linear velocities of one time, twice, and four times the normal linear velocity. This change in the loop gain is compensated for at the variable gain amplifier 43. Specifically, the gain of the variable gain amplifier 43 varies among the values of 0 dB, +6 dB, and +12 dB respectively for the linear velocities of one time, twice, and four times the normal linear velocity. Therefore, as shown in FIG. 8, the gain and phase characteristics remain unchanged with the change in the linear velocity, so that optimum gain characteristic and phase characteristic will be obtained.

As explained above, when the speed of the data reading is raised by the change in the linear velocity which is caused by changing the frequency of the master clock, the mixing ratio between the speed error signal and the phase error signal can be maintained constant by an arrangement that the clocks input to the phase comparator are divided at dividing ratios corresponding to the designated linear velocity. Furthermore, also the loop gain is maintained constant by the arrangement that the gain of the variable gain amplifier 43 is varied with the designated linear velocity, so that the stability of the spindle servo characteristic is maintained irrespectively of changes in the linear velocity.

In FIG. 1, if the circuit elements such as the speed detector 24, the phase comparator 29, and the frequency dividers are to be formed in a single-chip IC, these circuit elements will be formed by digital circuits. In this case, bit-length can be shortened by adopting as the structure of the speed detector 24 such a scheme that the D range is changed among one time, twice, and four times the normal value and the sensitivity of detection is changed among one time, a half, a quarter the normal value respectively for the linear velocities of one time, twice, four times the normal linear velocity.

In the embodiment described above, the circuit is arranged such that the frequency dividers 18 through 20 for frequency dividing the output pulse of the VCO, frequency dividers 25 through 27 for frequency dividing the writing clock, the frequency dividers 31 through 3 for frequency dividing the output clock of the crystal oscillator 30, and the frequency dividers 36 through 38 for frequency dividing the reading clock, are respectively series-connected at three stages, so that clocks having frequencies respectively corresponding to the designated linear velocities. However, such an arrangement is not limitative, and an arrangement in which frequency dividers having dividing ratios corresponding to the designated linear velocities are connected in parallel with each selector can also be adopted. With such an arrangement, clocks having frequencies corresponding to the designated linear velocities can be obtained in the similar manner.

Figure 9:
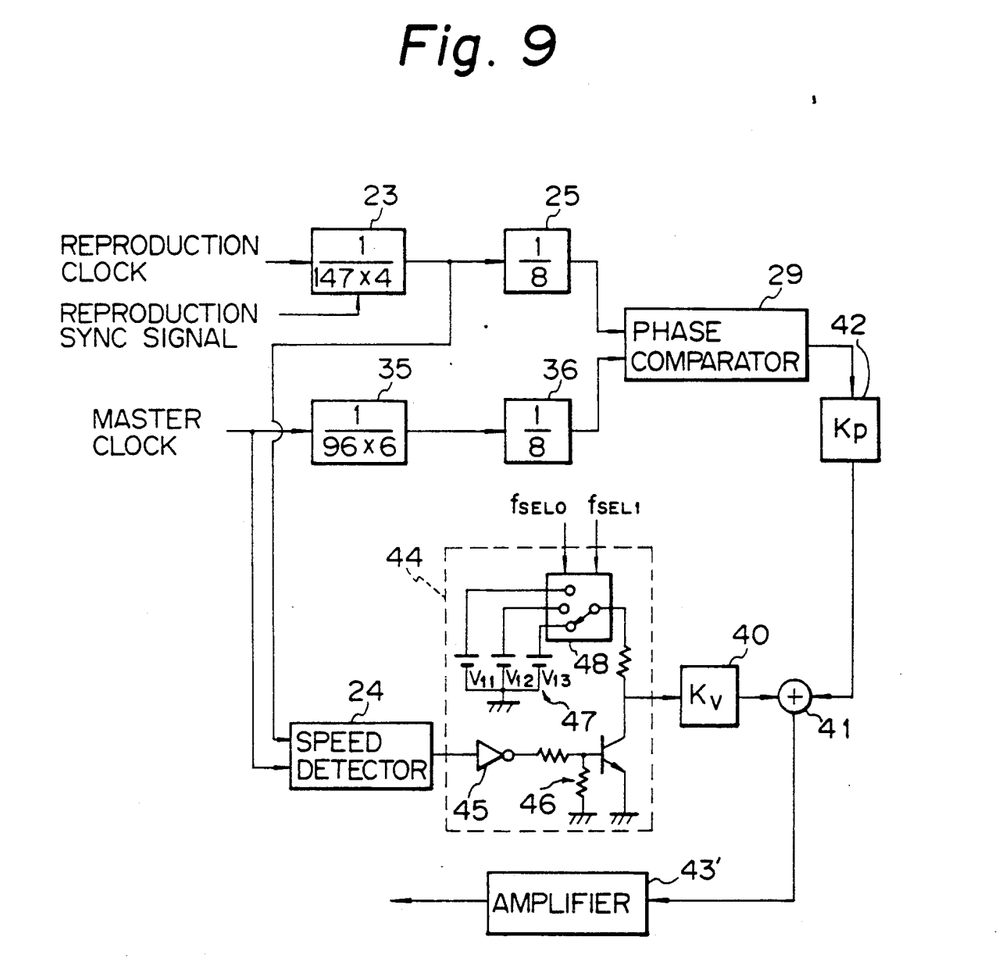
FIG. 9 is a block diagram partly in the form of circuit diagram showing an essential part of another embodiment of the present invention.

Furthermore, in the embodiment described above, the explanation has been made by way of example in which the mixing ratio between the speed error signal and the phase error signal is maintained constant by frequency dividing the input clock of the phase comparator 29 at the dividing ratio corresponding to the designated linear velocity in response to the change in the detection sensitivity of the speed detector 24, and the gain of the variable gain amplifier 43 is changed according to the designated linear velocity, at the time when the designated linear velocity is changed. However, such a circuit arrangement is not limitative, and various circuit arrangement may be employed for maintaining a constant mixing ratio between the speed error signal and the phase error signal, and a constant gain of the servo loop irrespectively of the change in the designated linear velocity. For example, an arrangement such as shown in FIG. 9 may be employed in which the gain of an amplifier 43' for amplifying the spindle error signal and the frequency of the input clock of the phase comparator 29 are fixed and a variable gain amplifier 44 is provided on the output side of the speed detector 24, the gain of the variable gain amplifier being set according to the designated linear velocity. With such arrangement, the sensitivity of the speed detection is maintained constant irrespectively of the change in the designated linear velocity, so that the mixing ratio between the speed error signal and the phase error signal can be maintained constant without the necessity of changing the sensitivity of the phase comparison. Furthermore, the loop gain can be also maintained constant with this arrangement.

As shown in FIG. 9, the variable gain amplifier 44 is made up of an invertor for inverting the polarity of the speed error signal, a digital transistor circuit 46 provided at the output stage thereof, a voltage generator circuit 47 for outputting compensation voltages of three stages $V_{11}$, $V_{12}$ and $V_{13}$ ($V_{11} > V_{12} > V_{13}$, $V_{11} = 2V_{12} = 4V_{13}$), and an analog switch 48 for alternatively selecting one of compensating voltages $V_{13}$, $V_{12}$, and $V_{11}$ and superimposing the same on the output of the digital transistor circuit 46 for the linear velocities of one time, twice and four times the normal linear velocity.

As explained specifically in the foregoing, the spindle servo circuit according to the present invention is constructed such that a reference clock having a frequency corresponding to the designated linear velocity is generated and a reproduction clock synchronized in phase with the read signal from the disk and having a frequency corresponding to the designated linear velocity is produced. A speed error signal and a phase error signal respectively corresponding to the frequency difference and the phase difference between the reference clock and the reproduction clock are generated, and the error signals are mixed at a constant mixing ration irrespectively of the change in the designated linear velocity. Furthermore, the loop gain is maintained constant irrespectively of the change in the designated linear velocity. With this structure, the mixing ratio between the speed and phase error signals and the gain of the servo loop are maintained constant irrespectively of the change in the designated linear velocity, so that stability of the spindle servo characteristic is assured. Thus, a high speed data reading by the increase of the linear velocity is attained.

What is claimed is:

1. A spindle servo circuit for controlling the speed of a spindle motor for rotating a disk in accordance with a spindle error signal, comprising:
   designating means for designating a predetermined linear velocity;
   reference clock generating means for generating a reference clock of a predetermined frequency corresponding to the linear velocity designated by the designating means;
   reproduction clock generating means for generating a reproduction clock synchronized in phase with a read signal from the disc and having a frequency corresponding to the linear velocity designated by the designating means;
   speed error signal generating means for generating a speed error signal corresponding to a frequency difference between said reference clock and said reproduction clock;
   phase error generating means for generating a phase error signal corresponding to a phase difference between the reference clock and the reproduction clock,
   mixing means for mixing the speed error signal and the phase error signal to derive said spindle error signal; and
   loop characteristic control means for maintaining a loop gain of the servo loop and a mixing ratio in the mixing means at constant values irrespectively of changes in the designated linear velocity.

2. A spindle servo circuit for controlling the speed of a spindle motor for rotating a disk in accordance with a spindle error signal, comprising:
   designating means for designating a predetermined linear velocity;
   reference clock generating means for generating a reference clock of a predetermined frequency corresponding to the linear velocity designated by the designating means;
   reproduction clock generating means for generating a reproduction clock synchronized in phase with a read signal from the disc and having a frequency corresponding to the linear velocity designated by the designating means;
   speed error signal generating means for generating a speed error signal corresponding to a frequency difference between said reference lock and said reproduction clock;
   phase error generating means for generating a phase error signal corresponding to a phase difference between the reference clock and the reproduction clock,
   mixing means for mixing the speed error signal and the phase error signal to derive said spindle error signal; and
   loop characteristic control means for maintaining a loop gain of the servo loop and a mixing ratio in the mixing means at constant values irrespectively of changes in the designated linear velocity, said loop characteristic control means comprising frequency dividing means for frequency dividing said reference clock and said reproduction clock respectively at dividing ratios corresponding to said designated linear velocity and supplying the frequency divided clocks to said phase error generating means, and a variable gain amplifier for amplifying said spindle error signal at a gain determined according to said designated linear velocity.

3. A spindle servo circuit for controlling the speed of a spindle motor for rotating a disk in accordance with a spindle error signal, comprising:
   designating means for designating a predetermined linear velocity;
   reference clock generating means for generating a reference clock of a predetermined frequency corresponding to the linear velocity designated by the designating means;
   reproduction clock generating means for generating a reproduction clock synchronized in phase with a read signal from the disc and having a frequency corresponding to the linear velocity designated by the designating means;
   speed error signal generating means for generating a speed error signal corresponding to a frequency difference between said reference lock and said reproduction clock;
   phase error generating means for generating a phase error signal corresponding to a phase difference between the reference clock and the reproduction clock,
   mixing means for mixing the speed error signal and the phase error signal to derive said spindle error signal; and
   loop characteristic control means for maintaining a loop gain of the servo loop and a mixing ratio in the mixing means at constant values irrespectively of changes in the designated linear velocity, said loop characteristic control means comprising a variable gain amplifier for amplifying said speed error signal at a gain determined according to said designated linear velocity.

* * * * *